Patented May 26, 1931

1,806,703

UNITED STATES PATENT OFFICE

KARL OTT, OF LEVERKUSEN-ON-THE-RHINE, AND HERIBERT SCHUESSLER, OF COLOGNE-DEUTZ, GERMANY, ASSIGNORS TO I. G. FARBENINDUSTRIE AKTIEN-GESELLSCHAFT, OF FRANKFORT-ON-THE-MAIN, GERMANY

MANUFACTURE OF CELLULOSE

No Drawing. Application filed March 5, 1930, Serial No. 433,504, and in Germany March 7, 1929.

The invention relates to a process of obtaining cellulose, particularly to the manufacture of cellulose from non-ligneous vegetable matter containing incrusted fibers.

It is a well known fact that the lignin which is the socalled incrusting part of wood and which is considered to be a substance containing free hydroxy groups may be converted into alkylated compounds soluble in organic solvents and having an acetal-like structure by alcoholysis, i. e. by reacting upon lignin with an alcohol in an acid medium. When, however, starting with any kind of wood, only part of the lignin is transformed into a soluble compound and it is not possible to obtain cellulose free from lignin. The products resulting from the alcoholysis of wood always contain considerable quantities of incrusting substances.

We have found that pure cellulose can be recovered by alcoholysis from non-ligneous vegetable materials, such as straw, bamboo, esparto or the like which are of a less dense structure than fir or beech wood. When treating, for example, grain-straw with an alcohol in an acid medium, practically all the lignin contained therein is rendered soluble and the remaining cellulose can be readily separated by filtering it from the alcoholic solution.

The aforesaid alcoholysis of non-ligneous vegetable matter may be carried out by means of mono- or polyvalent aliphatic or aliphatic aromatic alcohols as for example, methyl alcohol, ethyl alcohol, benzyl alcohol. The acid medium necessary for accomplishing the alcoholysis may be produced by adding to the mixture of non-ligneous vegetable matter and alcohol a small quantity, say up to 5 per cent., of a mineral acid, preferably a hydrogen halide or a substance splitting off an acid, preferably hydrogen halide at the working temperature, such as alkyl or aralkyl halides. The temperature of reaction will vary according to the starting material. In general it is above 100° C. and a particularly advantageous range is between 140 and 160° C. The time required for a complete alcoholysis of the lignin parts depends upon the pressure used as well as upon the starting material. We prefer to carry out the process under superatmospheric pressure and under such conditions alcoholysis will be completed within two or more hours.

The cellulose obtained by alcoholysis from straw and similar vegetable materials represents a product of commercial value capable of being bleached by bleaching agents and soluble in ammoniacal copper oxide solution. The lignin is obtained in the form of valuable, fusible acetal-like compounds soluble in organic solvents.

Our invention is illustrated by the following examples without being restricted thereto, the parts being by weight.

*Example 1.*—100 parts of chopped barley straw are added to 1000 parts of ethyl alcohol mixed with 20 parts of ethyl bromide. The mixture is then heated to about 150° C. in an autoclave for about two hours, pressure rising to 11 to 12 atmospheres. After filtering the alcoholic solution from the precipitate and washing with alcohol, about 40 to 45 parts of pure cellulose are obtained. The alcoholic solution is freed of the main part of alcohol by distillation and the residue is poured into dilute sulfuric acid, whereby bright brown flakes of an ethylated lignin are obtainable.

*Example 2.*—100 parts of chopped barley straw are added to 1000 parts of ethyl alcohol, containing 20% of hydrochloric acid gas and the mixture is allowed to stand for several days at normal temperature while stirring once in a while. After filtering and washing the residue with alcohol a cellulose still containing about 4% of lignin is obtained in a yield of 40% of the starting material. The alcoholic solution is further worked up as described in Example 1.

*Example 3.*—100 parts of esparto, 1000 parts of benzyl alcohol and 2.5 parts of concentrated hydrochloric acid (specific gravity 1.19) are heated to about 150° C. in an autoclave for about 8 hours. After filtering and washing out the benzyl alcohol by means of ethyl alcohol about 45 parts of cellulose are obtained. The solution containing benzyl alcohol is neutralized and distilled in vacuo until the main part of benzyl alcohol is distilled off. By pouring the residue into water, a benzylated lignin is obtained in the form of a brown powder.

In the following claims the term "non-ligneous vegetable matter" is intended to denote all kinds of vegetable matter other than wood and containing incrusted fibers, such as the different kinds of straw, for example, rye, wheat, barley or oat straw, bamboo, esparto or the like which materials are characterized by a rather incompact structure and a rather low density which is always below that of wood.

We claim:

1. Process which comprises reacting with an alcohol upon non-ligneous vegetable matter containing incrusted fibers in the presence of an acid medium.

2. Process which comprises reacting with an alcohol upon non-ligneous vegetable matter containing incrusted fibers and having a density less than fir wood in the presence of an acid medium.

3. Process which comprises reacting with an alcohol upon non-ligneous vegetable matter containing incrusted fibers and having a density less than fir wood in the presence of an acid medium at a temperature above 100° C.

4. Process which comprises reacting with a liquid alcohol upon non-ligneous vegetable matter containing incrusted fibers and having a density less than fir wood in the presence of an acid medium at a temperature above 100° C. for at least two hours and separating the cellulose from the alcoholic solution.

5. Process which comprises reacting with a liquid aliphatic alcohol upon non-ligneous vegetable matter containing incrusted fibers and having a density less than fir wood in the presence of an acid medium at a temperature above 100° C. for at least two hours and separating the cellulose from the alcoholic solution.

6. Process which comprises reacting with a liquid aliphatic alcohol upon straw in the presence of an acid agent at a temperature above 100° C. for at least two hours, separating the cellulose from the alcoholic solution and precipitating the alkylated lignin from the solution.

7. Process which comprises reacting with a liquid aliphatic alcohol upon straw in the presence of a hydrogen halide at a temperature between 140 and 160° C. for at least two hours, separating the cellulose from the alcoholic solution and precipitating the alkylated lignin from the solution.

8. Process which comprises reacting with ethyl alcohol upon straw in the presence of hydrogen chloride at a temperature of about 150° C. and under super-atmospheric pressure for between 2 and 8 hours. separating the cellulose from the alcoholic solution and precipitating the ethyl lignin from the solution by means of dilute mineral acid.

9. Process which comprises reacting with ethyl alcohol upon barley straw in the presence of hydrogen chloride at a temperature of about 150° C. and under super-atmospheric pressure for about 2 to 8 hours, separating the cellulose from the alcoholic solution and precipitating the ethyl lignin from the solution by means of dilute sulfuric acid.

In testimony whereof, we affix our signatures.

KARL OTT.
HERIBERT SCHUESSLER.